United States Patent
Afremov et al.

(10) Patent No.: US 10,937,558 B2
(45) Date of Patent: Mar. 2, 2021

(54) METHOD OF LAUNCHING NATURAL CIRCULATION OF LIQUID METAL COOLANT OF A FAST NEUTRON NUCLEAR CHAIN REACTOR

(71) Applicant: STATE ATOMIC ENERGY CORPORATION 'ROSATOM' ON BEHALF OF THE RUSSIAN FEDERATION, Moscow (RU)

(72) Inventors: Dmitrij Aleksandrovich Afremov, Moscow (RU); Denis Viktorovich Safronov, Moscow (RU); Evgeniya Sergeevna Hizhnyak, Moscow (RU); Kirill Albertovich Nikel, Moscow (RU); Natalia Viktorovna Romanova, Moscow (RU)

(73) Assignee: STATE ATOMIC ENERGY CORPORATION "ROSATOM" ON BEHALF OF THE RUSSIAN FEDERATION, Moscow (RU)

(*) Notice: Subject to any disclaimer, the term of this patent is extended or adjusted under 35 U.S.C. 154(b) by 0 days.

(21) Appl. No.: 16/633,047

(22) PCT Filed: Jul. 18, 2018

(86) PCT No.: PCT/RU2018/000478
§ 371 (c)(1),
(2) Date: Jan. 22, 2020

(87) PCT Pub. No.: WO2019/022640
PCT Pub. Date: Jan. 31, 2019

(65) Prior Publication Data
US 2020/0161008 A1    May 21, 2020

(30) Foreign Application Priority Data
Jul. 24, 2017    (RU) .............................. 2017126521

(51) Int. Cl.
*G21C 15/247*    (2006.01)
*G21C 15/00*    (2006.01)
*G21C 1/02*    (2006.01)

(52) U.S. Cl.
CPC .............. *G21C 15/247* (2013.01); *G21C 1/02* (2013.01); *G21C 15/00* (2013.01)

(58) Field of Classification Search
CPC .......... G21C 15/00; G21C 15/247; G21C 1/02
(Continued)

(56) References Cited

U.S. PATENT DOCUMENTS 4,293,385 A * 10/1981 Brachet .................... G21D 1/04
                                                                    376/405
4,359,627 A * 11/1982 Takeichi .................. G21C 1/02
                                                                    376/247
(Continued)

FOREIGN PATENT DOCUMENTS

CN    103021483 A     4/2013
CN    103366838 A    10/2013
(Continued)

OTHER PUBLICATIONS

PCT Application No. PCT/RU2018/000478, International Search Report, dated Nov. 22, 2018, 1 page.
(Continued)

*Primary Examiner* — Jack W Keith
*Assistant Examiner* — Daniel Wasil
(74) *Attorney, Agent, or Firm* — DLA Piper LLP (US)

(57) ABSTRACT

The method of launching natural circulation of the liquid metal coolant in the heat sink circuit of the fast neutron nuclear reactor without connection to the main heat source
(Continued)

Scheme of the heat sink circuit of a fast neutron nuclear reactor.

(first circuit heat sink) and without using pumping equipment, but only as a result of electric heating of the downing and lifting sections of the heat sink circuit to the specified temperatures and, as a consequence, the occurring difference in the densities of the coolant on the lifting and downing sections of the heat sink circuit.

5 Claims, 2 Drawing Sheets

(58) Field of Classification Search
USPC .......................................... 376/277, 359, 361
See application file for complete search history.

(56) References Cited

U.S. PATENT DOCUMENTS

| | | |
|---|---|---|
| 5,021,211 A | 6/1991 | Hunnsbedt et al. |
| 5,202,083 A | 4/1993 | Spinks et al. |
| 7,526,057 B2 | 4/2009 | Sim et al. |
| 2009/0129532 A1 | 5/2009 | Reyes, Jr. et al. |
| 2013/0114778 A1 | 5/2013 | Horie et al. |
| 2016/0336082 A1 | 11/2016 | Kubintsev et al. |

FOREIGN PATENT DOCUMENTS

| | | |
|---|---|---|
| CN | 105551551 A | 5/2016 |
| CN | 106409353 A | 2/2017 |
| JP | S5786090 A | 5/1982 |
| JP | S6029225 U | 2/1985 |
| JP | S6120893 A | 1/1986 |
| JP | 2003262690 A | 9/2003 |
| KR | 20050071735 A | 7/2005 |
| KR | 20100072374 A | 6/2010 |
| RU | 2188472 C2 | 8/2002 |
| RU | 2212066 C1 | 9/2003 |
| WO | WO 2011132612 A1 | 10/2011 |

OTHER PUBLICATIONS

PCT Application No. PCT/RU2018/000478, Written Opinion of the International Searching Authority, dated Nov. 22, 2018, 5 pages.

Usynin G.B. et al. Reaktory na bystrykh neitronakh. Ucheb. posobie dlia vuzov/Pod red. F.M. Mitenkova. M. Energoatomizdat, 1985, p. 197.

Ma et al., "Experimental study on natural circulation and its stability in a heavy liquid metal loop", Nuclear Engineering and Design, Amsterdam, NL, vol. 237, No. 15-17, Jul. 31, 2007 (Jul. 31, 2007), pp. 1838-1847, XP022182518, 10 pages.

* cited by examiner

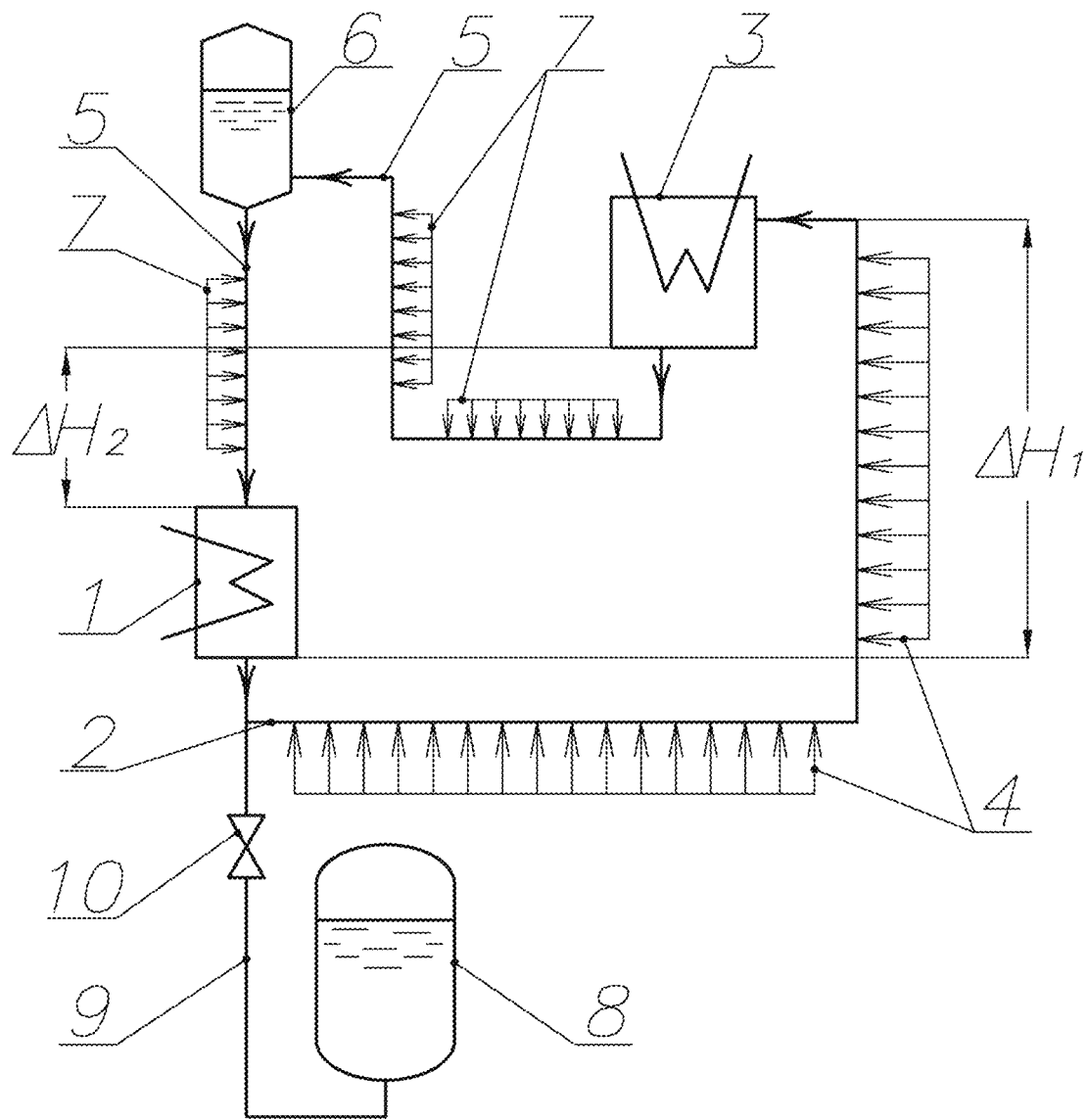
Figure 1. Scheme of the heat sink circuit of a fast neutron nuclear reactor.

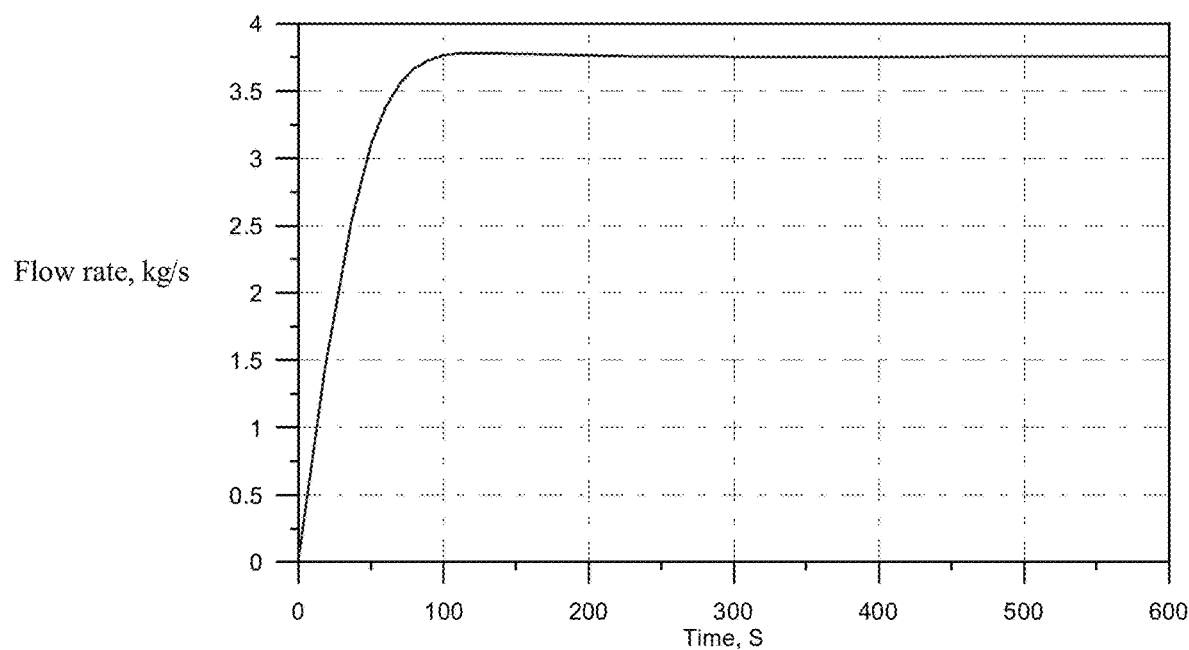
Figure 2. Graph of the natural circulation development without using a pump.

METHOD OF LAUNCHING NATURAL CIRCULATION OF LIQUID METAL COOLANT OF A FAST NEUTRON NUCLEAR CHAIN REACTOR

CROSS-REFERENCE TO RELATED APPLICATIONS

This application is a National Stage of PCT/RU2018/00478, filed Jul. 18, 2018, which claims the benefit of Russian application number 2017126521, filed Jul. 24, 2017. The entireties of which are incorporated by reference herewith.

FIELD

The invention relates to the field of nuclear engineering and can be used to organize the natural circulation of liquid metal coolant in the heat sink of a fast neutron nuclear reactor.

BACKGROUND

The closest to this invention is a method of organizing the natural circulation of liquid metal coolant in the heat sink of a fast neutron nuclear reactor, comprising the pre-heating of the lift and down flow pipes and equipment of the heat sink circuit with their subsequent filling with heated coolant, starting the circulation of the coolant in the circuit and switching to the natural circulation mode (G. B. Usynin, E. V. Kusmartsev Fast neutron reactors: Textbook for Universities/Edited by F. M. Mitenkov—M: Energoatomizdat, 1985 p. 197).

Pipelines and equipment for the lifting and downing sections of the heat sink circuit before the initial filling with liquid metal coolant (or after inspection and repair) have a temperature approximately equal to the ambient temperature. The liquid metal coolant located in the tank of the filling and drainage system is heated to a temperature of about 200-250° C. Therefore, before supplying the heated liquid metal coolant to the heat sink circuit, the pipelines and equipment must be heated to the same temperature to prevent overcooling ("hardening") of the liquid metal coolant. For heating, electric heaters are used, which are installed on pipelines and equipment of the lifting and downing sections of the heat sink circuit. Then, the heated coolant is fed into the heat sink circuit until the required level in the tank for compensating thermal expansions is reached. After filling the lifting and downing sections of the circuit with the coolant, the forced circulation is started in the circuit using pumps. The transition to the natural circulation mode is made after the nuclear reactor reaches its rated operating parameters.

SUMMARY

In order to create a driving pressure of circulation without using pumping equipment and to provide the required direction of natural circulation of the liquid metal coolant in the heat sink circuit of the fast neutron nuclear reactor in the absence of heat transfer from the reactor before filling the pipelines and equipment of the lifting and downing sections of the circuit, they are pre-heated by electric heating to temperatures $T_1$ and $T_2$, respectively, which are selected from the condition of inequality:

$$p_1(T_1) \cdot g \cdot \Delta H_1 > p_2(T_2) \cdot g \cdot \Delta H_2 + P$$

where: $p_1(T_1)$ is the density of the liquid metal coolant at temperature $T_1$ of pipelines and equipment in the lifting section; $p_2(T_2)$ is the density of the liquid metal coolant at temperature $T_2$ of pipelines and equipment at the downing section; is the height difference between the inlet and outlet of the lifting section; is the height difference between the inlet and outlet of the downing section; P is the hydraulic resistance of the circuit; g is the acceleration of gravity. After filling the heat sink circuit with liquid metal coolant the natural circulation mode occurs as a result of the moving pressure of the circulation due to the difference in densities $p_1(T_1)$ and $p_2(T_2)$ of the liquid until the nuclear reactor reaches its rated operating parameters.

BRIEF DESCRIPTION OF THE FIGURES

FIG. 1 shows a diagram of the embodiments described herein;

FIG. 2 shows an example graph of the natural circulation development, according to embodiments described herein.

DETAILED DESCRIPTION

Reference will now be made in detail to embodiments, examples of which are illustrated in the accompanying drawings. In the following detailed description, numerous specific details are set forth in order to provide a sufficient understanding of the subject matter presented herein. But it will be apparent to one of ordinary skill in the art that the subject matter may be practiced without these specific details. Moreover, the particular embodiments described herein are provided by way of example and should not be used to limit the scope of the invention to these particular embodiments. In other instances, well-known data structures, timing protocols, software operations, procedures, and components have not been described in detail so as not to unnecessarily obscure aspects of the embodiments of the invention.

The disadvantage of the method of launching the circulation of the coolant in the heat sink circuit using a startup pump is the presence of additional hydraulic resistance in the circuit due to the pumping equipment used when starting the circulation and in the forced circulation mode until the reactor reaches its rated power, as well as the inability to switch from the forced circulation mode to natural circulation without heat transfer from the nuclear reactor.

The objective of this invention is to provide a method for organizing the natural circulation of liquid metal coolant in the heat sink circuit of a fast neutron nuclear reactor, in which there is no forced circulation mode, and the heat sink circuit works, including when starting, only in the natural circulation mode and in the absence of heat transfer from the nuclear reactor, i.e. before power ascension, which ensures the passive safety of the nuclear reactor and the reactor unit as a whole.

The technical result of this invention is to initiate natural circulation by creating a driving pressure of circulation and providing the desired direction of natural circulation of the liquid metal coolant in the heat sink without transferring heat from the nuclear reactor. In addition, the technical result is a significant reduction in hydraulic resistance due to the lack of pumping equipment in the heat sink circuit.

The specified technical result is achieved by the fact that the pipelines and equipment of the lifting and downing sections of the heat sink circuit are preheated to temperatures $T_1$ and $T_2$, respectively, which are selected from the conditions of inequality:

$$p_1(T_1) \cdot g \cdot \Delta H_1 > p_2(T_2) \cdot g \cdot \Delta H_2 + \Delta P,$$

where:
$p_1(T_1)$ is the density of the liquid metal coolant at temperature $T_1$ of pipelines and equipment in the lifting section;
$p_2(T_2)$ is the density of the liquid metal coolant at temperature $T_2$ of pipelines and equipment at the downing section;
$\Delta H_1$ is the height difference between the inlet and outlet of the lifting section;
$\Delta H_2$ is the height difference between the inlet and outlet of the downing section;
$\Delta P$ is the hydraulic resistance of the circuit
g is the acceleration of gravity
after filling the heat sink circuit with liquid metal coolant due to the occurring difference in densities $p_1(T_1)$ and $p_2(T_2)$ of the coolant in the lifting and downing sections of the heat sink circuit the natural circulation mode occurs.

The claimed combination of essential features allows the natural circulation to start in the heat sink of the nuclear reactor without connecting to the main heat source, but only due to electric heating to the calculated temperature of the pipelines and equipment of the lifting and downing sections and, therefore, due to the temperature difference (density difference) of the coolant filling them. Therefore, at the time of the nuclear reactor starting, the heat sink circuit will already function in the natural circulation mode and thereby ensure the passive safety of the reactor unit as a whole. Compared to the prototype, there is no forced circulation mode in the claimed method, which also helps increase nuclear safety.

The essence of this invention is illustrated by drawings, where a diagram of a heat sink circuit of the fast neutron nuclear reactor is presented in the FIG. 1, and FIG. 2 shows a graph of the development of natural circulation without using a pump.

The heat sink circuit contains heat source 1, which can be used as a heat exchanger that is connected to the first reactor circuit (not shown in the drawing) or a nuclear reactor (not shown in the drawing). The output of heat source 1 is connected by means of a lifting pipe 2 with the input of the device for removing heat 3, which is used as an air heat exchanger. Sectional electric heaters 4 are installed on the lifting pipe 2 along the entire length. The outlet of heat removal device 3 is connected by downing pipe 5 to heat source 1 through a tank to compensate thermal expansion of coolant 6. Sectional electric heaters 7, similar to electric heaters 4, are installed on downing pipe 5 along the entire length. The heat sink circuit is connected to the tank of filling and drainage system 8 by means of drainage pipe 9 with valve 10. Heat source 1, heat removal device 3 and tank for compensating thermal expansion of the coolant 6 are equipped with sectioned electric heaters (not shown in the drawing). To minimize heat loss, the heat sink circuit (pipelines 2, 5, 9, heat source 1, heat removal device 3 and tank for compensating thermal expansion of the coolant 6) is provided with thermal insulation (not shown in the drawing).

The method is as follows.

To organize the natural circulation of the liquid metal coolant, which is used as sodium, the following sequence of actions is performed in the heat sink circuit of the research fast neutron nuclear reactor. Sectionalized electric heaters 4 and 7 are switched on for heating pipelines and equipment for the lifting and downing sections of the heat sink circuit to the calculated temperatures $T_1=230°$ C. and $T_2=210°$ C., respectively. At the same time, the settings of the current regulators provide heating and maintaining the temperature for heat source 1—230° C., for the lifting pipe 2—230° C., for the heat removal device 3—210° C., for downing pipe 5 and the tank for compensating thermal expansion of coolant 6—210° C. Then, evacuation and argon filling of the heat sink circuit are successively performed, and after reaching the required composition of the heat sink circuit gaseous medium, sodium is supplied to the heat sink circuit through the drainage pipe 9 with a flow rate of 2 m³/h and temperature of 225° C. from the tank of the filling and drainage system 8, by opening the valve 10. In start-up mode, the heat source 1 does not work as a heat exchanger, but is used only for the passage of the coolant through it. When sodium reaches the required level in the tank for compensating thermal expansion 6, valve 10 is closed. The pressure in the gas cavity of tank for compensating thermal expansion 6 rises to 0.14 MPa. In the process of filling the heat sink circuit, the sodium coolant receives the temperature of the pipelines walls and the equipment of the circuit, as a result of which a driving pressure of natural circulation is created in the desired direction.

As shown in FIG. 2 under the influence of the natural circulation pressure created by the initial temperature difference $T_1$ and $T_2$ of the walls of lifting pipeline 2 and lowering pipeline 5, the sodium flow rate increases from zero to a stabilized value of 3.76 kg/s for 150 s and then remains constant. In the steady state of natural circulation, heat removal device 3 provides the necessary reduction in the temperature of the coolant at the entrance of the downing section. The temperature of sodium at the inlet and outlet of the heat sink circuit elements is 210° C. at the input of the heat source 1; 225° C. at the output of heat source 1; 230° C. at the input of heat removal device 3; 210° C. at the output of heat removal device 3. To calculate the temperatures $T_1$ and $T_2$, the following values were used: the height of heat source output 1—6.2 m, the height of heat removal device input 3—11.1 m, the height of heat removal device output 3—8.4 m, the height of heat source input 1—6.9 m, coolant density on the lifting section $p_1(T_1)$—896 kg/m3, the density of the coolant in the downing section $p_2(T_2)$—901 kg/m3, the height difference between the inlet and outlet of the lifting section $\Delta H_1$—4.9 m, the height difference between the inlet and outlet of the downing section $\Delta H_2$—1.5 m, the hydraulic resistance of the circuit—1,600 Pa.

The invention claimed is:
1. A method for launching natural circulation of liquid metal coolant in a heat sink circuit of a fast neutron nuclear reactor, the method comprising:
   pre-heating pipelines and equipment of both lifting and downing sections of the heat sink circuit;
   filling the pipelines and equipment with heated coolant;
   causing circulation of the heated coolant in the heat sink circuit;
   switching to a natural circulation mode, wherein the pipelines and equipment of the lifting and downing sections of the heat sink circuit are pre-heated by electric heating respectively, to temperatures $T_1$ and $T_2$, wherein $T_1$ and $T_2$ are selected from conditions of inequality:

$$p_1(T_1) \cdot g \cdot \Delta H_1 > p_2(T_2) \cdot g \cdot \Delta H_2 + \Delta P$$

where, $p_1(T_1)$ is a density of a liquid metal coolant at temperature $T_1$ of pipelines and equipment in the lifting section;

$\rho_2(T_2)$ is the density of a liquid metal coolant at temperature $T_2$ of pipelines and equipment at the downing section;

$\Delta H_1$ is a height difference between an inlet and outlet of the lifting section;

$\Delta H_2$ is a height difference between an inlet and outlet of the downing section;

$\Delta P$ is a hydraulic resistance of the circuit;

g is acceleration of gravity; and simultaneous launching of circulation of the coolant in the heat sink circuit with the switching to the natural circulation mode until the liquid metal coolant in the fast neutron nuclear reactor is circulating due to the difference in densities $\rho 1(T_1)$ and $\rho_2(T_2)$ of the liquid metal coolant, respectively, in the lifting and downing sections of the circuit.

2. The method of claim 1 wherein the liquid metal coolant is sodium.

3. The method of claim 1 wherein the pre-heating of the pipelines and equipment is by sectional electric heaters.

4. The method of claim 3 wherein $T_1$ is 230 degrees C. and $T_2$ is 210 degrees C.

5. The method of claim 1 wherein the filling the pipelines and equipment with heated coolant is at a flow rate of 2 m³/hr and a temperature of 225 degrees C.

* * * * *